(12) United States Patent
Wood (10) Patent No.: US 7,403,913 B2
(45) Date of Patent: Jul. 22, 2008

(54) SYSTEM AND METHOD FOR DISTRIBUTING RECORDINGS OF LIVE PERFORMANCES

(76) Inventor: Tim Wood, 570 30th St., San Francisco, CA (US) 94131

(*) Notice: Subject to any disclaimer, the term of this patent is extended or adjusted under 35 U.S.C. 154(b) by 337 days.

(21) Appl. No.: 10/840,395

(22) Filed: May 6, 2004

(65) Prior Publication Data
US 2005/0251454 A1    Nov. 10, 2005

Related U.S. Application Data

(60) Provisional application No. 60/468,873, filed on May 8, 2003.

(51) Int. Cl.
*G06Q 30/00* (2006.01)
(52) U.S. Cl. .................. 705/26; 705/1; 705/27
(58) Field of Classification Search .................. 705/26, 705/27
See application file for complete search history.

(56) References Cited

U.S. PATENT DOCUMENTS

| | | | |
|---|---|---|---|
| 5,570,415 | A | 10/1996 | Stretton |
| 6,182,128 | B1 | 1/2001 | Kelmar |
| 6,385,596 | B1 | 5/2002 | Wiser et al. |
| 6,423,892 | B1 | 7/2002 | Ramaswamy |
| 6,647,417 | B1 | 11/2003 | Hunter et al. |
| 6,681,120 | B1 | 1/2004 | Kim |
| 6,920,428 | B2 * | 7/2005 | Greene .................. 705/16 |
| 2003/0076963 | A1 * | 4/2003 | Wells .................. 381/1 |
| 2003/0158790 | A1 * | 8/2003 | Kargman .................. 705/26 |
| 2004/0019564 | A1 * | 1/2004 | Goldthwaite et al. .......... 705/44 |
| 2004/0024647 | A1 * | 2/2004 | Cheung .................. 705/26 |
| 2006/0085339 | A1 * | 4/2006 | Hutchison et al. .......... 705/40 |

OTHER PUBLICATIONS

"Generating One-Time URLs with PHP" Daniel Solin, Dec. 5, 2002. Retrieved from <http://www.onlamp.com/pub/a/php/2002/12/05/one_time_URLs.html> one Feb. 21, 2007.*
"Summer has increased sales of SMS Tickets by 30%." Europemedia. Amsterdam: Aug. 25, 2002. p. 1. Retrieved via ProQuest on Apr. 10, 2008.*

* cited by examiner

*Primary Examiner*—Jeffrey A. Smith
*Assistant Examiner*—Michael A. Misiaszek
(74) *Attorney, Agent, or Firm*—Philip Koenig (57) ABSTRACT

The invention is a system and method for the distribution of recordings of live audio and/or video performances to audience members at a performance. The system comprises means for promptly uploading recordings of performance segments into a database controlled by an order server. An audience member employs a wireless messaging devices such as a cellular telephone to place an order for a recording with a Short Message Service linked to said order server, and, upon arranging for payment of a recording download, said audience member is provided (via a text message to the ordering wireless device) with an internet URL address at which a copy of the recording ordered has been made available for download.

12 Claims, 11 Drawing Sheets

SYSTEM AND METHOD FOR DISTRIBUTING RECORDINGS OF LIVE PERFORMANCES

The present application claims priority from Provisional Application for Patent Ser. No. 60/468,873 filed May 8, 2003 and entitled Live Music Purchase System.

FIELD OF THE INVENTION

The invention is directed to a system and method for the distribution of recordings of audio and video performances, and particularly to a system and method employing wireless messaging devices as a means for audience members at a live performance to order recordings of performance segments from said performance for subsequent downloading from internet sources promptly following said performance.

BACKGROUND OF THE INVENTION

There is a need in the entertainment industry for alternative music and video purchase and distribution models. With respect to music distribution, the field to which the present invention is principally addressed, the traditional big-label, expensively-produced record under the control of rack-jobbers and radio programmers is becoming obsolete. Peer file-sharing networks and a lack of consistency and originality in the offerings of major artists have caused a serious creative and financial recession in music. Meanwhile today's music business erects high barriers in the way of small, innovative acts who seek to have their music heard and to grow an audience for their recordings. A new channel is needed that bypasses the current music industry while protecting the rights and meeting the needs of stakeholders in music.

SUMMARY OF THE INVENTION

The present invention is an audio and video purchase and distribution system and method that enables the recording, payment for, and substantially immediate distribution of recordings of stage performances before a live audience. The invention is particularly appropriate for small music acts that have no contract with a major record label and that typically play to audiences of 1000 or less, and it also offers a substantial new source of revenue for established acts under contract with a large record company.

A system according to the invention allows an audience member at a live performance to order a recording of the very piece (herein, "segment") then being played (or that has been played earlier in the performance), and subsequently to download an audio and/or a video file of the selected piece from an internet URL address provided by the operator of the system. In preferred embodiments of the invention, an audience member employs a cellular telephone (preferably in silent mode, to not disrupt the performance) to order one or more performance segments, simply by entering an alphanumeric ID that has been assigned to a song or other concert segment, and for example displayed on a message board at the concert site, into an SMS (Short Message Service) message, addressed to a telephone number provided by the system operator.

In one such embodiment of the invention, the audience member on returning home employs a land-line telephone to call an automated 900 number maintained by the system operator, in order to arrange for payment of the performance segment ordered by the caller, via a "900 area code" billing to the caller's home telephone bill. Upon the making of such payment arrangement, the system causes the SMS center to call the cellular telephone from which the order was initially placed, and to message to that cellular telephone an internet URL from which the ordered performance segment may be downloaded at the convenience of the ordering party.

Entering said URL address into an Internet browser then allows a single download of a high-quality digital recording audio and/or video file from the actual performance attended by said audience member, for burning onto a suitable storage medium such as CD, DVD or MP3 player storage.

Another embodiment of the invention provides for the establishment of a base of registered subscribers, who on providing the system provider with pre-payment means, such as appropriate credit card information and authorization, become entitled to download ordered recordings without recourse to the "900 area code" payment arrangement described above.

Another embodiment provides for arranging payment for recordings with a plurality of third-party providers of payment services, such as Pay-Pal.

Yet another embodiment of the invention enables home television viewers to order performance segments from televised performances broadcast over cable and satellite networks, by ordering performance segments via a two-way cable or satellite converter. The converter has on-screen menus that implement ordering and fulfillment. A converter with built-in digital data storage functionality can automatically initiate the download of parts of or all of the requested video recording to its built-in disk drive. The cable or satellite provider charges the viewer's home cable or satellite bill for the downloaded recording(s).

DETAILED DESCRIPTION OF PREFERRED EMBODIMENTS OF THE INVENTION

Introduction

The following description of preferred embodiments will first describe in general terms the principal components and aspects of a system according to the present invention, focused on an embodiment whereby audience members order performance segments via cellular telephones and payment is made through use of 900 area code billing.

The above description is then followed by a detailed description of a preferred computer and communications architecture for supporting a system according to the invention. The artist/system interactions, and the methods preferably employed for managing recordings of performance segments within said computer and communications architecture, are then described.

Subsequent subsections detail the operation of the system with several classes of customer/users distinguished by payment arrangements, including customers who are registered members of a "prepaid" subscription service administered by the operators of the recording distribution system, and customers billed via other third-party providers of payment services. Additional subsections of this description describe the application of the invention to the ordering of recordings of performances viewed from pay-per-view cable or satellite broadcasts.

Overview of System Using Cell Phones and 900 Area Code Billing

A principal intended application of the present invention comprises a system whereby audience members at a live performance venue employ cellular telephones, or other personal wireless communications devices having a text-messaging capability, to order recordings of performance segments by placing orders to a Short Message Service center. Preferably a system according to the invention also comprises a variety of means enabling payment for purchased recordings. Supported types of payment arrangements may for example include the use of third-party payment services providers such as PayPal or credit card accounts, and a subscription system whereby repeat customers may establish and maintain an account having an ongoing balance from which payments for recordings may be debited, in addition to or in lieu of billings through a provider of "900 area code" services (that are normally billed to a customer's landline telephone service account).

It will generally be particularly desirable, where feasible, for a system operator to establish a customer base comprising prepaid customers, who have established accounts with the system operator, for example including provision for monthly use charges. A suggested method for registering such a prepaid membership base is described elsewhere in this description, with reference to FIG. 6.

Figure 1:
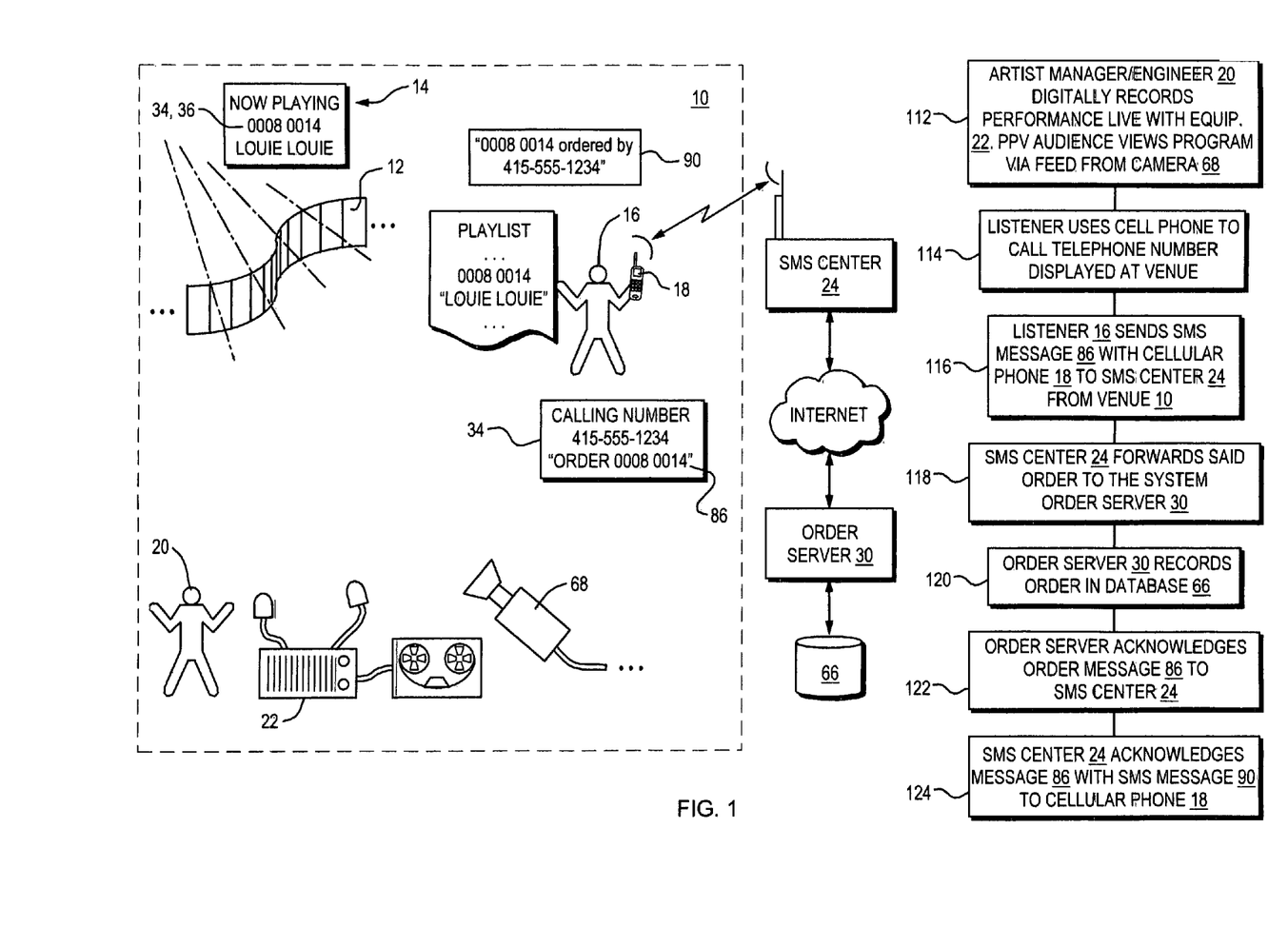
FIG. 1 illustrates components and method steps employed in an embodiment of the invention to enable the ordering of performance segments by an audience member at a performance venue.

Referring now to FIG. 1 there is shown a concert venue 10 comprising stage 12 for the use of the performing artists, a display device 14 for displaying to audience members, such as audience member 16, the title of a performance segment 34 then being performed on stage 12, in association with a unique segment identifier 36 (preferably in the form of a simple alpha-numeric string, illustratively shown as 80014 for the tune "Louie Louie" in FIG. 1), and also for displaying one or more messaging telephone numbers at which orders for performance segments may be placed.

Recording engineer 20 employs digital recording equipment 22 to record performance segments as each is performed live on stage 12. (Where a pay-per-view implementation is being conducted, there is also present and being operated a PPV camera 68 for providing a video feed of the live performance to a cable/satellite base station (not shown)). As shown in greater detail on FIG. 4, artist personnel at step 112 upload the resulting recordings to order server 30, preferably within minutes following the recorded performance.

At step 114 on FIG. 1 audience member 16 employs a personal wireless text messaging device 18 such as a cellular telephone to place a call to SMS center 24, at a messaging telephone number advertised on display 14.

At step 116 audience member 16 then uses a text message, "80014", to place an order 86 for a performance segment 34, associated with segment identifier 36 here shown as ID number "80014". Preferably the advertised ordering telephone number addresses an automated Short Message Service provider, illustrated here as SMS center 24, and a performance segment order is placed, as illustrated, simply by entering an alphanumeric message containing the performance segment identifier. Preferably, a plurality of performance identifiers may be included in a single message from audience member 16 to SMS center 24.

Optionally a system may be implemented whereby order calls from audience members are received and processed at an automated voice-recognition telephone answering service, or an answering service employing human operators to receive and place calls.

As shown at step 118 in FIG. 1, on receiving an order 86 from personal messaging device 18 of audience member 16, SMS center 24 forwards said order to the system order server 30, via an internet gateway or any other suitable wired or wireless communications means. As shown at step 120 in FIG. 1, order server 30 records the newly received order into order database 66 and, preferably, it then returns to SMS center 24 an "order received" acknowledgment (at step 122 in FIG. 1). In step 124, SMS center 24 then in turn transmits by wireless telephonic transmission an "order received" acknowledgment message to the personal messaging device of audience member 16.

As earlier stated, one embodiment of the present invention comprises means for payment of recordings by means of "900 Area Code" payment programs. Pursuant to such programs, telephone calls to a number accessed through the 900 area code may be made subject to the payment of charges as established by the licensee of said "900" number. While "900" call charges are typically based on a fee-per-minute charge set by the licensee, the charge may be set in other ways, such as a fixed fee for service, subject to acceptance by the caller; however fixed, such charges as are accepted by the telephone user are charged and billed to the telephonic device from which the "900" call originated.

In the context of the present invention, payment arrangements using "900" telephone billing may operate as illustrated on FIG. 2, as follows: in step 126, audience member 16 intending to place a call to a "900 area code" payment service, to pay for the purchase of one or more recordings, employs an ordinary landline telephone to place a call to the advertised "900" number. This call by audience member 16 is answered by an automated answering system 66, operated by 900 service provider 68.

Figure 2:
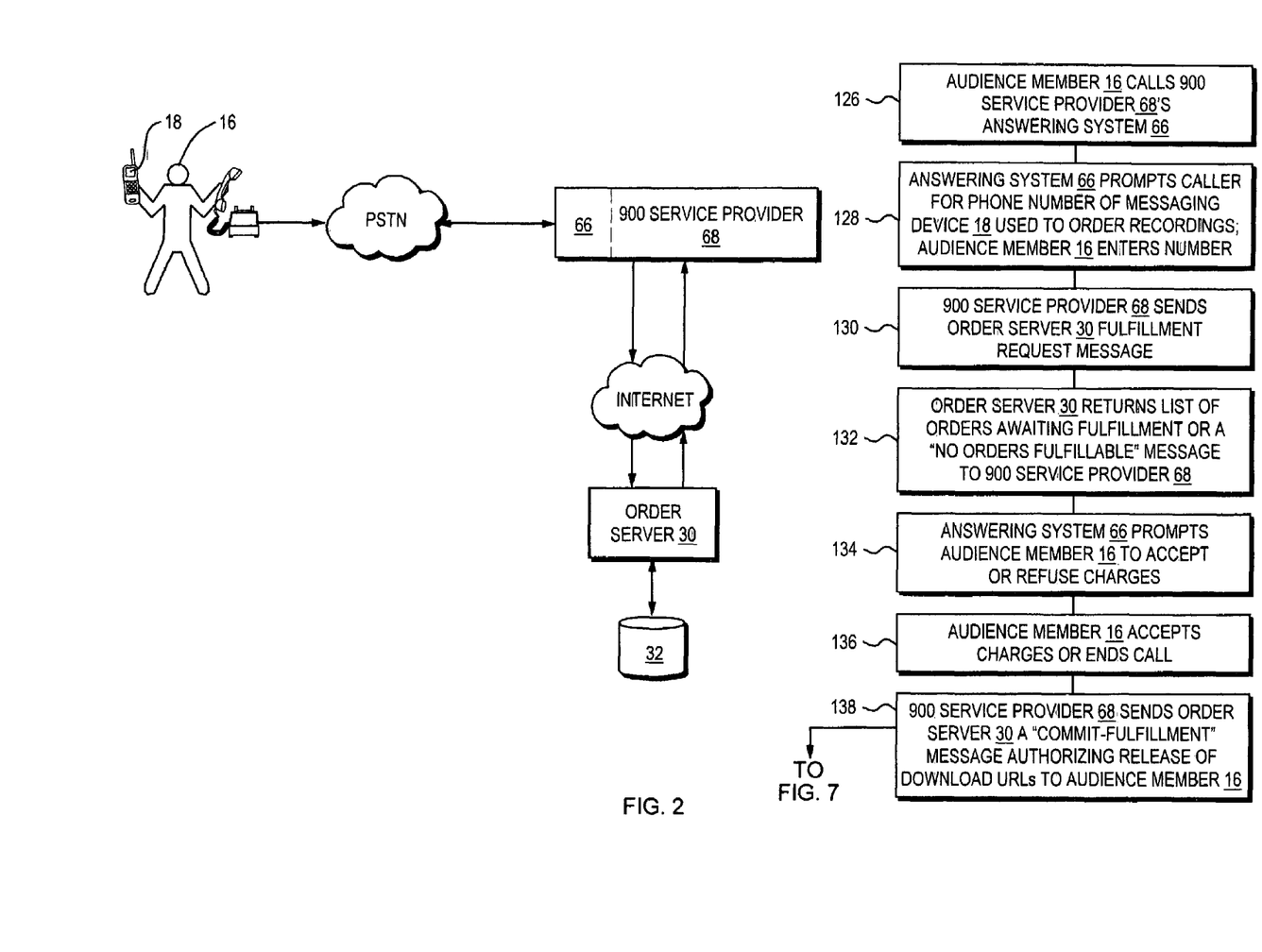
FIG. 2 illustrates components and method steps employed in an embodiment of the invention to implement payments for recordings via a "900 area code" billing service.

Following introductory comments that may, for example, describe the ordering procedure, the "900 area code" answering system 66, at step 128 in FIG. 2, then asks the caller to enter the telephone number of the actual messaging device, such as cellular telephone 18, that audience member 16 initially used to place the order for recordings. "900" service provider 68 then, at step 130, preferably employs internet communications means to communicate to order server 30 the fulfillment request placed by audience member 16. In step 132, order server 30 returns to "900" service provider 68 an acknowledgment that said order consists of a particular set of recordings, or, alternatively, that said order may not be filled (for example upon a determination that the telephone number employed to pay for the order is on a payment default list, the cellular telephone is listed as stolen, or the like).

Where completion of the order is authorized, "900" answering service 66 at step 134 advises the caller of the charges applicable to a download of the ordered recording(s) (and any other applicable charges), and prompts audience member 16 to accept such charge (or, where appropriate, informs the caller that the purchase request cannot be filled).

Upon confirmation of charge acceptance by the user of the "900" service, at step 136, "900" service provider 68 at step 140 communicates to order server 30 a "commit-fulfillment" message, with suitable identifiers to inform order server 30 that said "900" caller has made payment arrangements to cover the download of the performance segment(s) ordered from that caller's messaging device.

Figure 7:
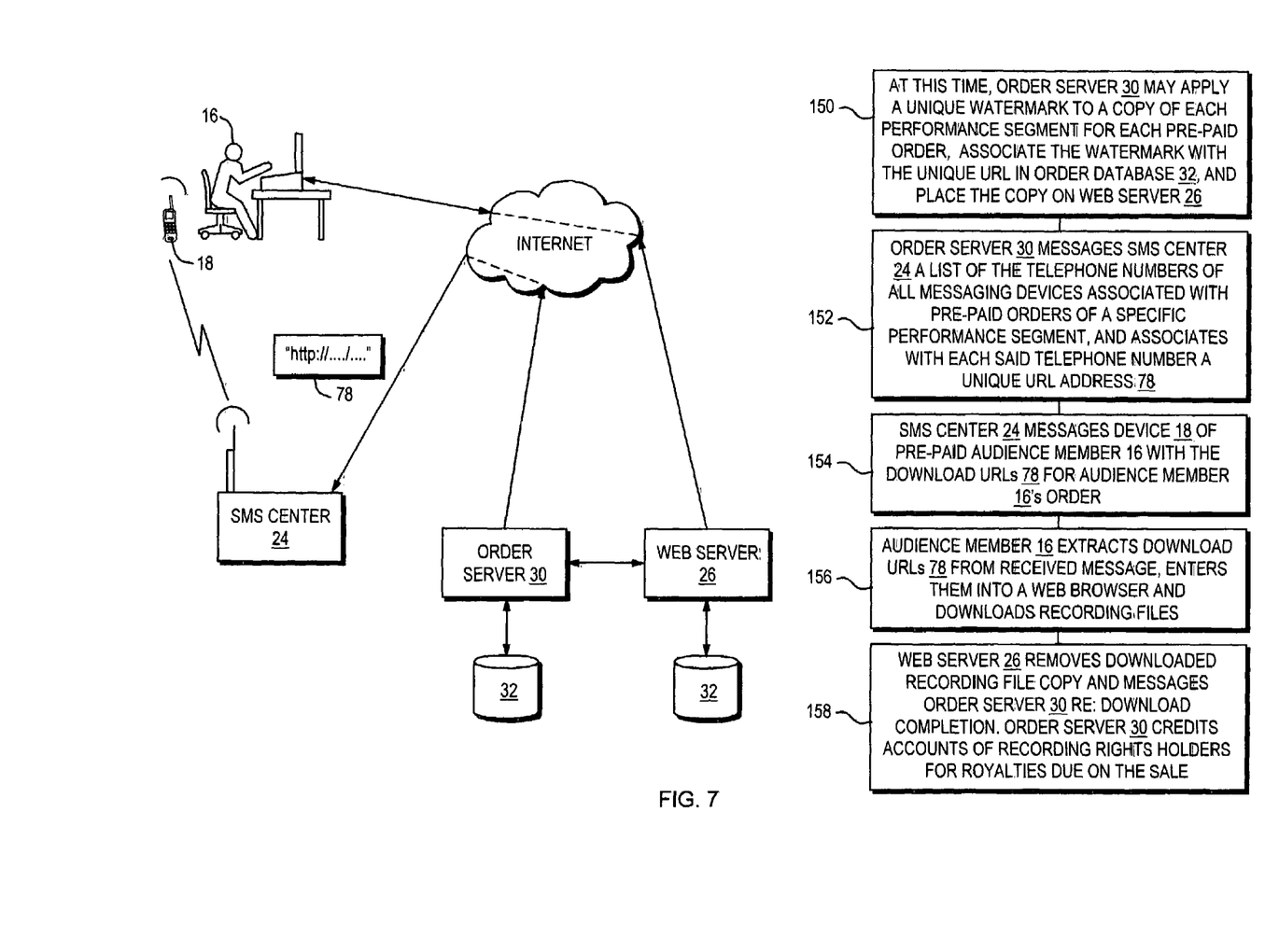
FIG. 7 illustrates components and method steps employed in an embodiment of the invention to implement the fulfillment of orders for performance segment recordings.

Notification to order server 30 that payment arrangements have been satisfied with respect to a recording order serves to trigger the order fulfillment procedures illustrated on FIG. 7. These procedures are effectively the same regardless of the payment method employed, which may have been the 900 billing service method described above, membership in a subscription program that provides for prepayment of recording orders, as further described below, or recourse by the person placing the order to a third-party provider of payment services such as PayPal or a credit card service.

Before proceeding to a detailed description of the order fulfillment procedures illustrated in FIG. 7, the overall architecture of a preferred embodiment of the invention will first be described, with reference to FIG. 3, in order to identify the components employed in the recording publication procedure and the order fulfillment procedure. The following is a preliminary and general description of these procedures.

In general terms, order server 30 generates, for each performance segment it receives and makes available for downloading, a set of internet URL addresses from which a copy of said performance segment may be downloaded, associating each such URL address with a specific received order for a recording of said segment.

Subsequently, order server 30 publishes to SMS Center 24, preferably in a burst operation, a listing of "fulfillment calls" to be made to the personal messaging devices 18 of each person having ordered a recording of a specific performance segment, and that have made payment arrangements for their orders. Said listing of fulfillment calls includes, for each said personal messaging device, an identification of the recording ordered, and an internet URL address at which a copy of the recording associated with the order received from said personal messaging device may be downloaded.

From said listing received from order server 30, SMS Center 24 proceeds to message each messaging device on said listing, with a text message that identifies the performance segment, or segments, to which the message pertains and that further includes a unique URL address allocated to the copy of each said performance segment ordered from said messaging device. On receipt of this text message from SMS center 24, the user of said personal messaging device may then at leisure access said internet URL address from any personal computer, or other device equipped with browser means for accessing internet URL addresses and downloading files, and from that URL address effect a single download of the ordered performance segment.

Architecture of Supporting Computer and Communications Resources

Figure 3A:
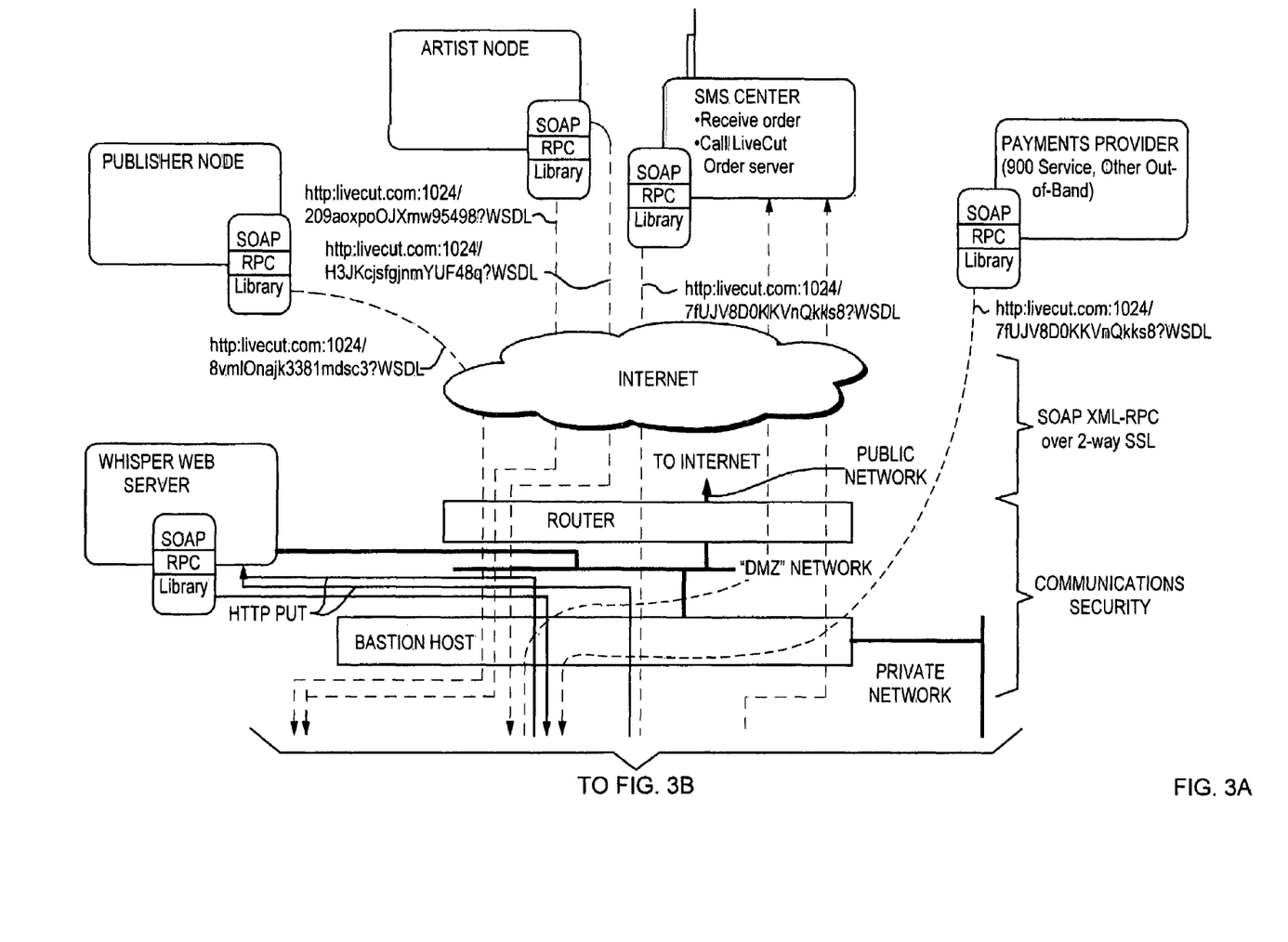
FIG. 3 is a diagram illustrating the overall architecture of a recording distribution system according to the invention.
Figure 3B:
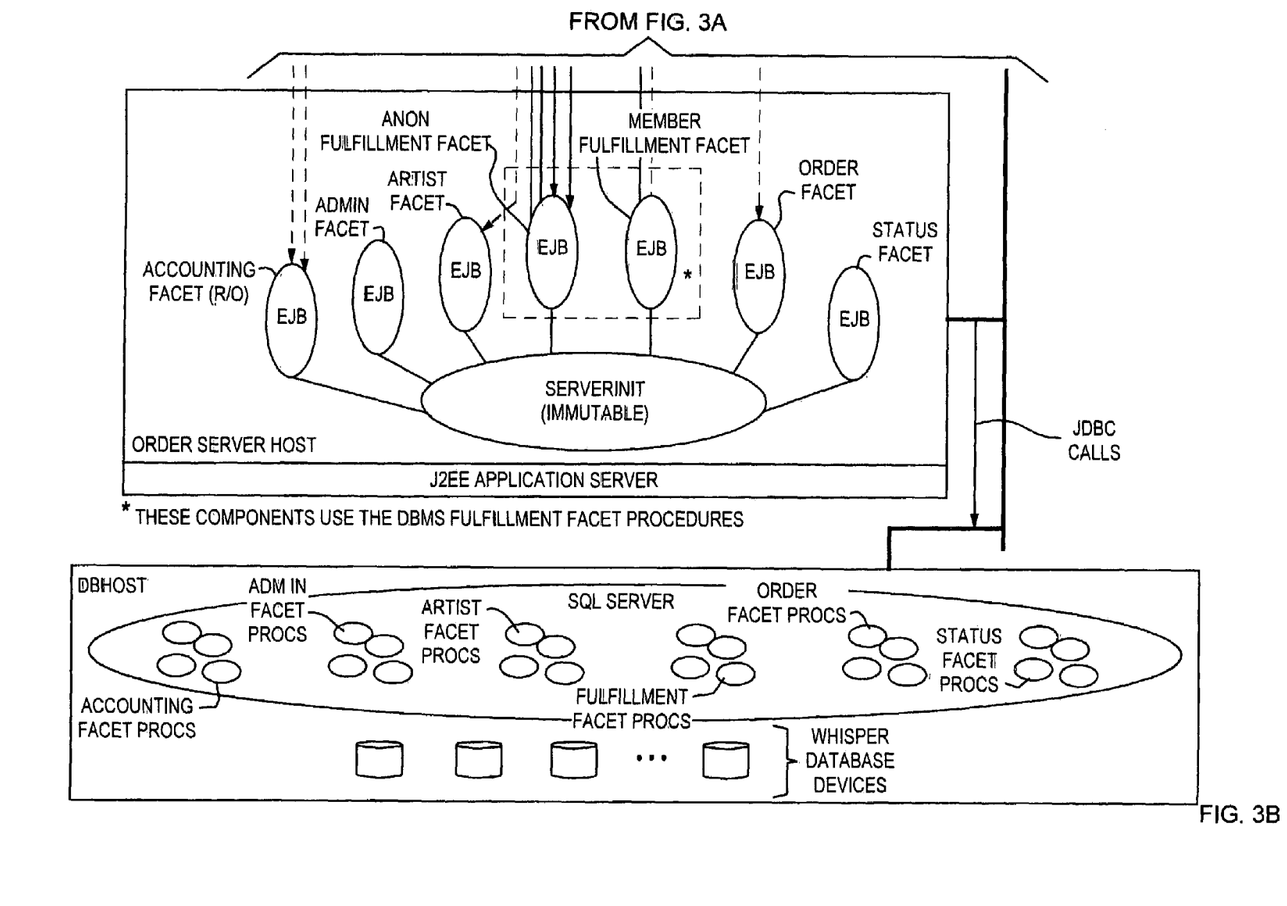

FIG. 3 is a schematic illustration of the principal components and subcomponents of a recording distribution system according to the present invention. The hardware components of said system comprise principally order server 30, web server 26, and database devices 32. Ancillary hardware components include a bastion component 56 that serves effectively as a "firewall" between web server 26 and order server 30, limiting traffic to SSL (Secure Socket Layer) protected communications, and router 58 which functions to manage traffic between web server 26 and external "clients" including the remote personal computers of system customers, the computers of artists needing to upload performance segments into the system (represented on FIG. 2 by "artist node" 38), SMS center 24, and payment providers 70.

Among the components illustrated on FIG. 3, order server 30 is the functional center of all business logic in the recording distribution system. Order server 30 thus runs the order server service process which accepts work requests through a plurality of software modules or "facets", including accounting facet 42, administrative facet 44, artist facet 46, member fulfillment facet 48, anonymous fulfillment facet 50, order facet 52, and status facet 54. Use of said separate facets serves to enhance security by dividing up access to the functions of the order server according to the needs of a particular client of the service. For example the artist facet implements the functions that recording artists require, primarily including the uploading of recordings of performance segments; artists do not require access to the order fulfillment functions that system customers employ to arrange for payment for recordings and to download recordings, and vice versa.

In preferred embodiments of the invention, division of responsibility among software modules extends to the database connection level: each facet of order server 30 connects to database 32 under a separate user ID, and is authorized only for that subset of database resources that it requires to perform its functions.

Order server 30 uses database 32 to maintain membership data, transaction data, and the master recordings of performance segments obtained from artists under contract with the system operator. Every recording sold to a system customer originates from a master recording of the same performance segment stored in database 32 for each order of a given performance segment received by the recording distribution system, order server 30 places a copy of said recording segment onto the web server 26 under a unique, randomly-selected filename; upon the making of a payment arrangement by the customer, order server 30 generates and forwards to web server 26, for transmittal to said customer, an internet URL address containing said unique filename. Said customer may then download that file (and no other) from website 28 maintained by web server 26. Upon such download of a file by the customer who ordered it, web server 26 automatically deletes said file, in the process keeping an accurate count of the number of copies of each performance segment dispensed to customers, for administrative purposes including the accounting of royalties due to rights holders with respect to said performance segment.

Artist/System Interaction

Figure 4:
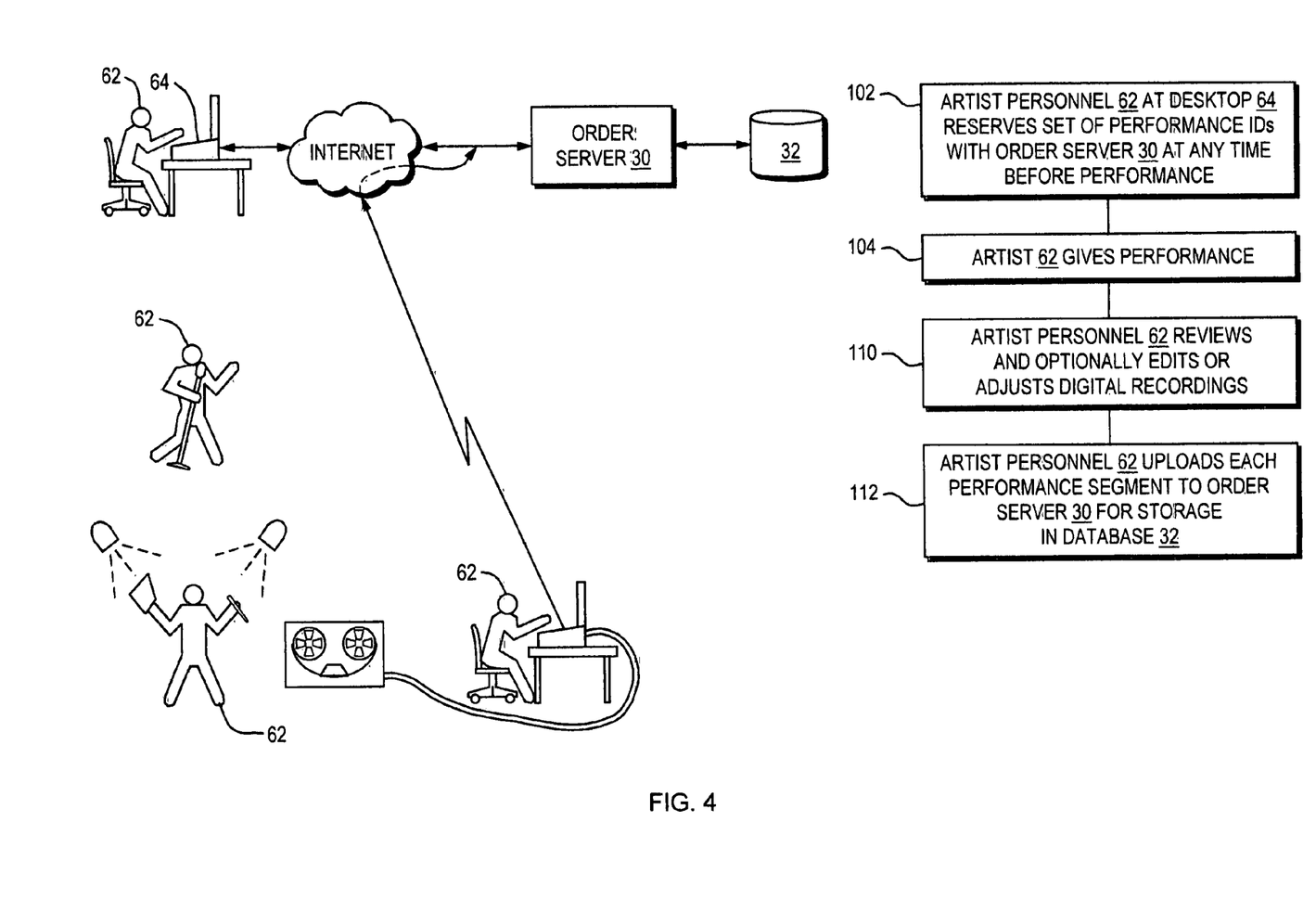
FIG. 4 illustrates components and method steps employed in an embodiment of the invention for the upload of performance segments by performance artists.

Referring to FIG. 4, there is shown artist personnel 62 at a desktop 64 in internet communication with system order server 30. In step 102 artist personnel 62 reserves with order server 30 a set of performance identifiers ID-nnn to ID-nnn . . . n, and order server 30 causes said reservation of performance identifiers to be stored in order database 32 in association with an identifier for artist personnel 62.

In step 104, the artist gives the live performance; this step represents the artist point of view of the arrangement shown in FIG. 1.

In step 110 the artist and the artist's supporting personnel, such as producers, managers, and other assistants, here symbolized by illustrative artist personnel 62, process each newly recorded performance segment and prepare each said segment for uploading to the system host computer. Such processing may be minimal, and consist simply of directly uploading an initial digital recording of a performance segment effectively immediately following its completion, or even as the performance segment is being initially recorded. Alternatively, it may entail intermediary technical processing, following the initial recording and preceding the uploading of an enhanced-quality digital recording to order server 30; such technical processing may for example include a quality control operation, compression of the recorded data, and other processing steps.

Preferably the uploading of recordings of performance segments to order server 30 should take place very promptly following the performance itself, most preferably within minutes of said performance.

In step 112 on FIG. 4 a newly recorded performance segment 34 is uploaded by artist-associated personnel 62 to system order server 30 for storage of the recording in database 32 managed by order server computer 30.

Publication of Recordings and Order Fulfillment

Figure 5:
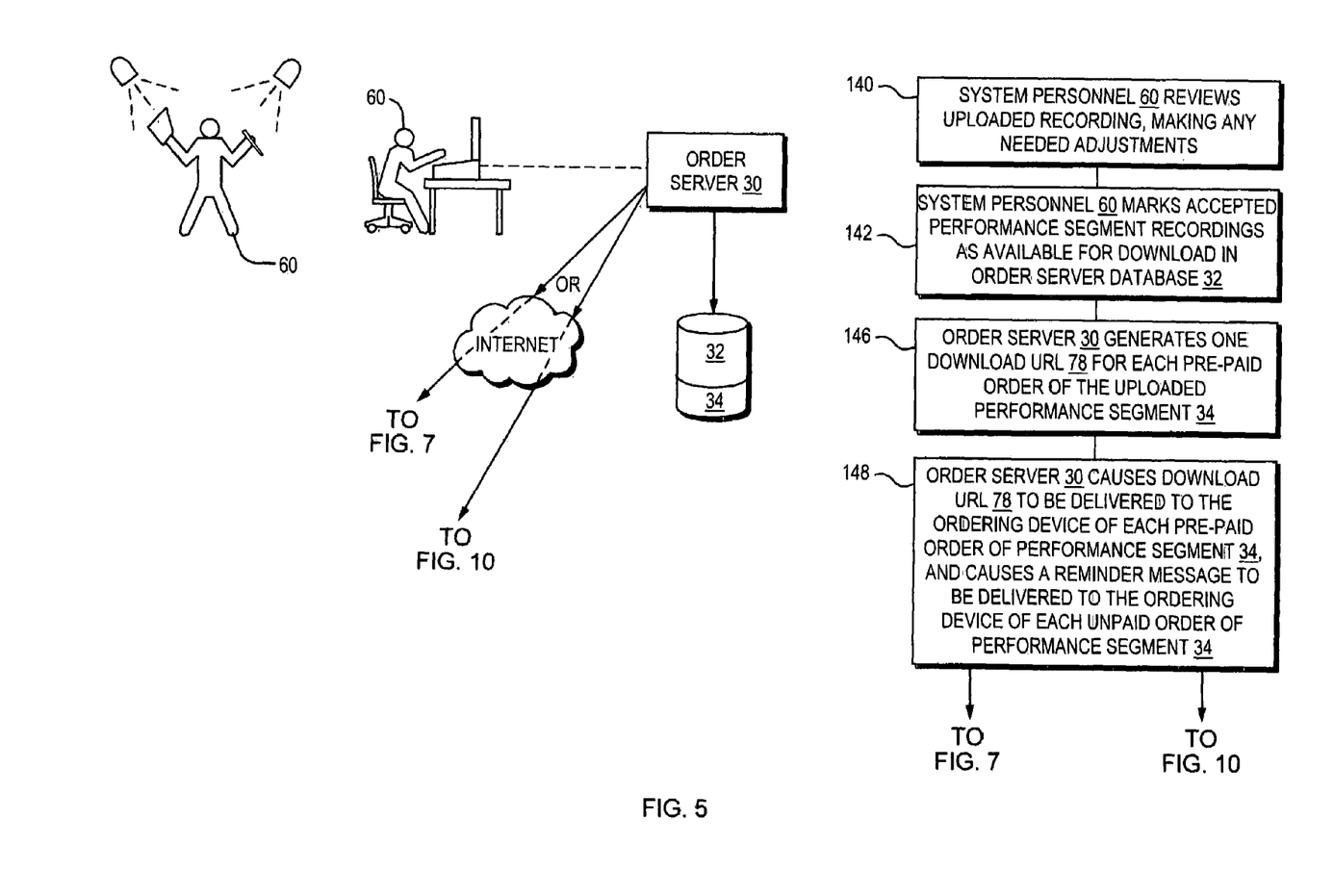
FIG. 5 illustrates components and method steps employed in an embodiment of the invention to implement the publication of ordered performance segments.

The steps associated with the processing of newly uploaded performance segments, and their "publication" in fulfillment of customer orders are shown in FIG. 5. Following the upload of a recorded performance segment onto order server 30 as shown in FIG. 4, and referring now to FIG. 5, in step 140 system personnel 60 optionally and preferably perform quality assurance and other technical processing operations on performance segments newly received from a performance venue, preparatory to marking said performance segment in order server database 32 for download availability.

Upon satisfaction with recording quality, system personnel 60 at step 142 marks performance segment 34 for download availability into the system order server database 32. In response to such marking order server 30 at step 146 generates a set of unique internet URL addresses 78 for association with said performance segment 34. From this set of URL addresses, persons who have ordered a recording of said performance segment, and have arranged for its payment, are to be provided with a unique internet URL address 78 that grants a single user access to a single download of a recording of said segment.

To control unauthorized distributions of downloaded performance segments, it is recommended that appropriate security measures be taken. Thus order server 30, upon generating and assigning a set of unique URL addresses to each performance segment 34 as a said segment is approved for download access, may at this time also apply a unique watermark to each copy of said performance segment that is to be made available for download from system web server website 28, and associate each said unique watermark with each said URL address.

Preferably, order server 30 at this time also places a notification of the download availability of said performance segment 34 on selected websites, including website 28 maintained on system web server 26 and optionally on an artist website 40 maintained by the artist who performed said segment, for purchase in accordance with any conventional means for internet commerce. In that way members of the general public, in addition to concertgoers, may order recordings of performance segments from any personal computer.

Order server 30, upon marking a performance segment 34 as qualified for downloading, acts to implement the downloading capability, preferably by providing system web server 26 with a set of copies of said performance segment, and with a listing wherein each of said copies is associated (a) with an identifier of an order for a recording of said segment (which identifier may be the telephone number of the personal messaging device 18 used to place the order); (b) with a unique watermark as described above, and (c) with a unique internet URL address at which said copy of segment 34 may be downloaded once.

In step 148 on FIG. 5 order server 30 then effects a notification, to each personal messaging device from which a said performance segment 34 has been ordered, that said segment is now available for download. In this notification procedure, order server 30 distinguishes between orders placed from personal messaging devices associated with a class of persons that have pre-arranged payment, such as prepaid account members registered as described below, and orders placed by other classes of customers, comprising persons who want to arrange payment via various types of third-party payment services providers, such as a "900 area code" billing services, PayPal, and credit card services.

Order Fulfillment for Prepaid Orders

A preferred method for handling the fulfillment of prepaid orders for recordings is illustrated in FIG. 7. At step 150 in FIG. 7 order server 30 has, for each prepaid order received regarding a specific performance segment 34, generated a copy of said performance segment and placed said copy on web server 26, having first assigned a unique interned URL to said copy, associated each such copy with a specific prepaid older, and applied to each such copy a distinctive watermark (such as will enable the association of any unauthorized copy of said performance segment that may be found to be linked to the specific download order from which such unauthorized copy originated).

At step 152 on FIG. 7, order server 30 then messages SMS Center 24 a list of the telephone numbers of all personal messaging devices from which said prepaid orders for said performance segment 34 were received, and associates with each such telephone number the said unique internet URL address that has been allocated uniquely to the recording order that originated from that specific telephone number.

SMS center 24 then messages each telephone number on the list thus received from order server 30, at step 154, with a message that contains the URL address from which the user of the messaging device associated with said telephone number may download the performance segment initially ordered from that specific messaging device. At step 156 in FIG. 7, audience member 16 on receiving such a text message from SMS Center 24 proceeds to extract the URL address from the SMS center message, and enters this URL address in the web browser of any internet-accessing device, such as any personal computer, and proceeds to download a copy of performance segment 34.

Following such download of performance segment 34 by audience member 16, web server 26 at step 158 on FIG. 7 removes the now downloaded file of said performance segment, and messages order server 30 a notification of download completion. Where appropriate order server at this time also credits the accounts of any holders of recording rights for any royalties accruing by reason of the sale of a recording of said performance segment.

Order Fulfillment for PayPal and Other Third-Party Payment Services Providers

With respect to orders regarding a download-available performance segment 34 that were received at SMS center 24 from persons lacking any pre-payment arrangements, order server 30 will preferably communicate, to SMS center 24, an instruction to publish a message to each personal messaging device having placed such an order, preferably as a text message but optionally a voice message, stating that said segment 34 will be available upon arranging for payment in a specified manner. Preferably, several modes of payment are made available, including for example payment using a PayPal account or an account maintained with other third-party providers of payment services such as credit card accounts.

Figure 8:
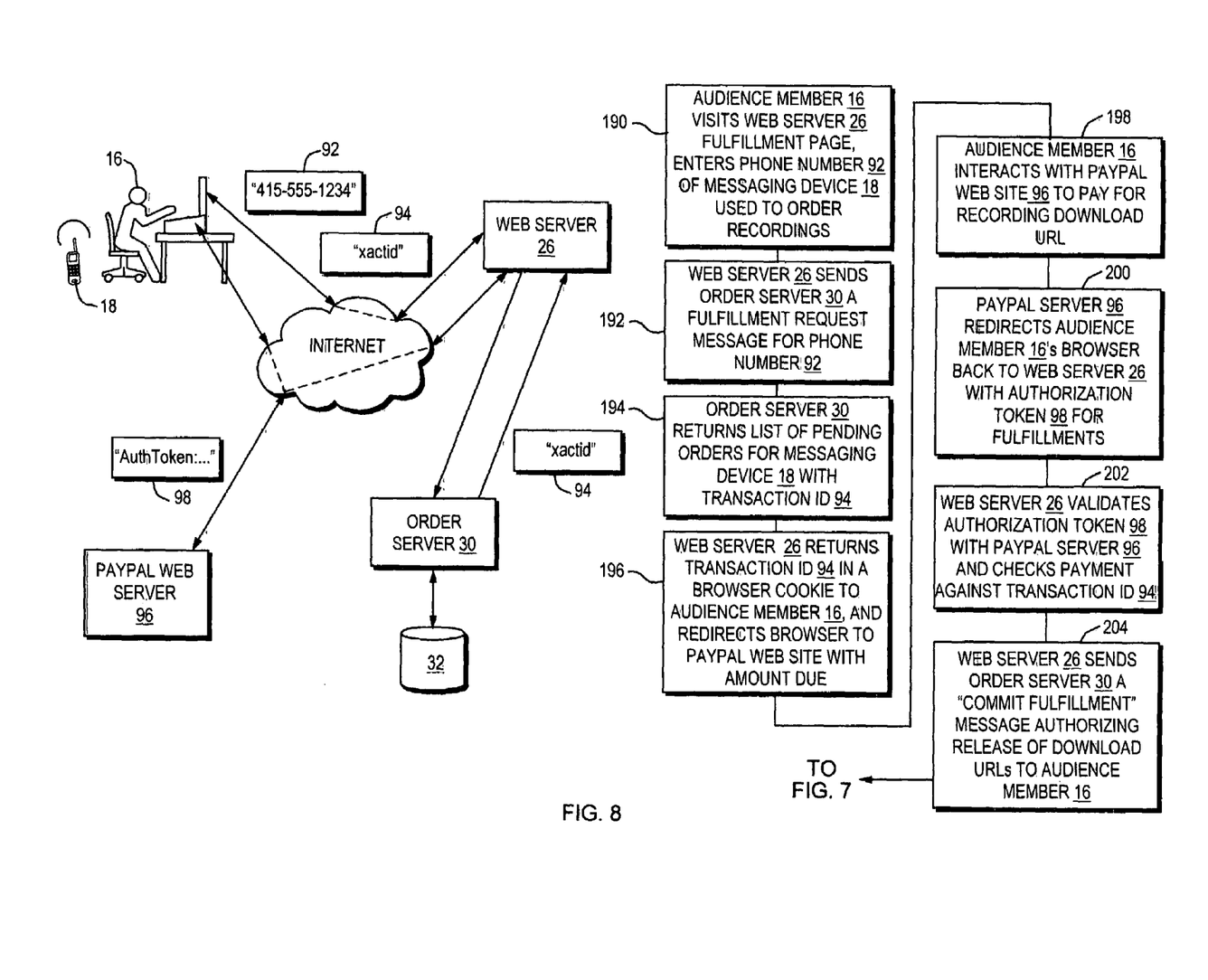
FIG. 8 illustrates components and method steps employed in an embodiment of the invention to implement payments for recordings via third-party payment services such as PayPal.

FIG. 8 illustrates a preferred method for the fulfillment of orders placed by audience members and other customers who wish to arrange payment through a PayPal account, or more generally through a third-party provider of payment services.

At step 190 on FIG. 8 an audience member 16, who has previously messaged an order for a performance segment, via a text message as described above from a personal messaging device 18 to an SMS Center 24, chooses not to employ a 900 billing service and instead uses a personal computer (or any device having internet browsing means) to visit a web site maintained by web server 26 and there accesses an order fulfillment page. At said order fulfillment page, audience member 16 enters the telephone number 92 of the messaging device 18 from which said audience member placed the order for a recording of performance segment 34.

At step 192 on FIG. 8 web server 26 sends order server 30 a fulfillment request message, specifying messaging device telephone number 92. In response order server 30 returns to web server 26, at step 194, a list containing all pending orders shown to have been received and associated with said telephone number 92, and further provides web server 26 with transaction identification (ID) 94. In turn web server 26, at step 196, returns transaction ID 94 in a browser cookie to the personal computer of audience member 16.

Audience member 16 at this point may direct transaction ID 94 to any third-party payment services provider of choice, where such payment provider has made itself receptive to the handling of such payment transactions for audience member 16. Where audience member 16 has selected PayPal as the desired provider of payment services, said audience member simply directs his or her computer browser to the PayPal website, transmits transaction ID 94 to said PayPal website, and interacts with the PayPal website to complete the payment transaction. At the conclusion of such interaction, at step 200 in FIG. 8, PayPal server 96, in accordance with established PayPal procedures, will proceed to redirect the browser of the personal computer of audience member 16 back to web server 26, maintained by the operator of the music distribution system according to the invention, and to transmit to web server 26 an authorization token 98 for the fulfillment of the transaction that was conditioned on PayPal payment.

At step 202 in FIG. 8, web server 26 then validates said authorization token 98 with PayPal server 96, and then checks the payment information against transaction ID 94. Where such checks confirms payment, web server 26 sends order server 30 a "commit fulfillment" message authorizing the release, to the messaging device 18 of audience member 16, of all download URL addresses assigned to copies of performance segments ordered by audience member 16 via said messaging device.

Access to a performance segment 34 via its uniquely associated URL address 78 should preferably be conditioned to "one-time use" download capability. Thus, upon the completion of a download of performance segment 34 via an assigned URL address 78, the association between said URL address and access to said performance segment is, preferably, automatically and immediately eradicated. Such eradication is easily implemented with a simple "file removal" operation on web server 26, such that any subsequent attempt to access said performance segment from said URL returns a "file not found" message.

Upon completion of a performance segment download as described above, web server 26 will preferably notify order server 30 of the download and order server 30 will initiate appropriate accounting and administrative procedures. Thus order server 30 will debit the pre-paid account of the pre-paid registered member; order server 30 will also at this time credit the account of any recording rights holder entitled to a royalty upon the sale of any recording of said performance segment.

Registration Procedure for Potential Subscribers

The present invention will be most advantageously implemented where a substantial base of repeat purchasers of recordings has been developed, and organized into a well-administered class of registered members, each having established an account that provides reliable means for the pre-payment of recording downloads. Various types of prepayment arrangements may be employed, as is well-known to persons of skill in the art of internet commerce.

Figure 6:
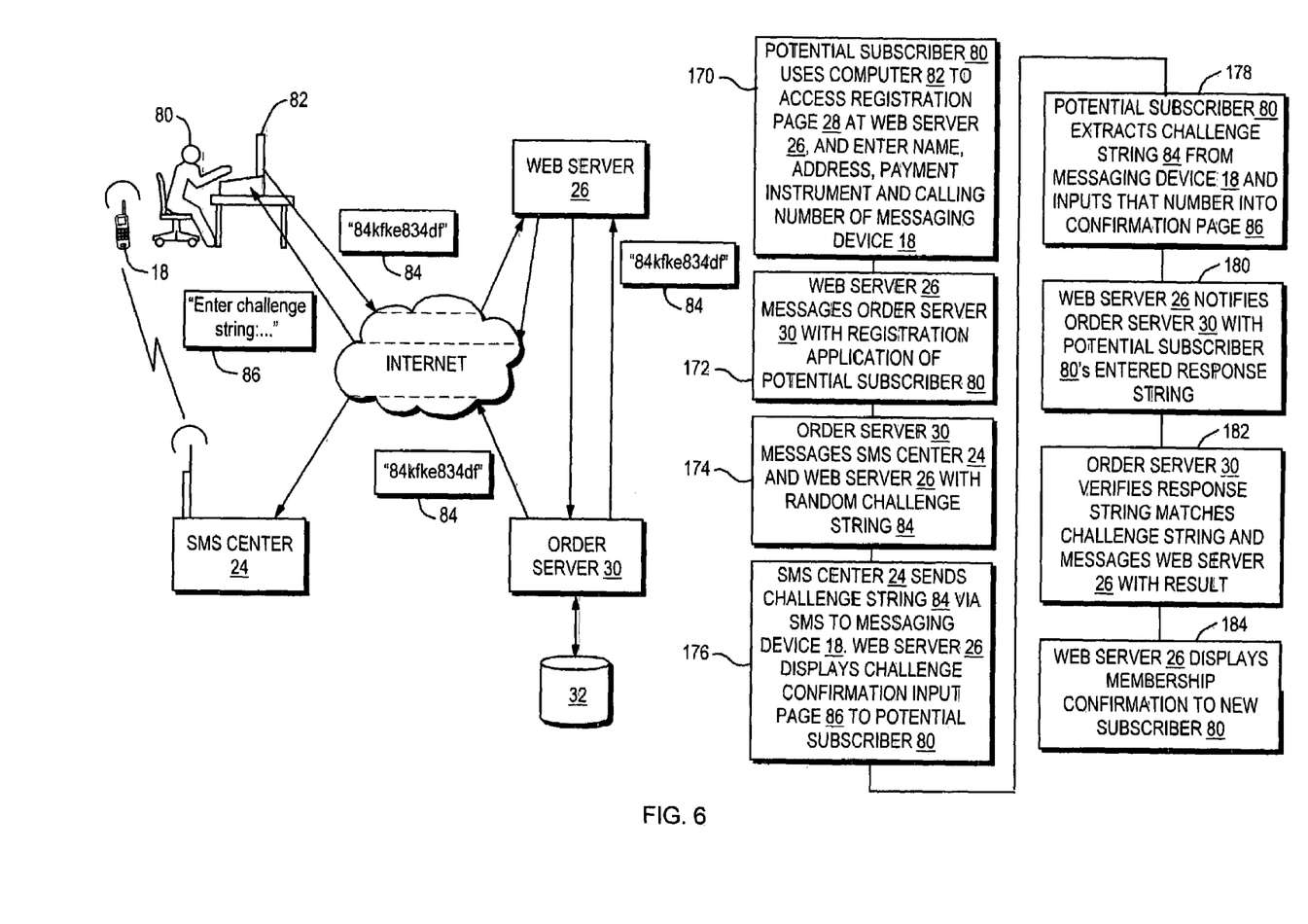
FIG. 6 illustrates a process for registering members to a prepaid subscription payment model as an aspect of a system according to the present invention.

Recommended procedures for establishing such subscriber pre-payment accounts, that take into account the system's reliance on wireless messaging means, are illustrated on FIG. 6. Referring now to FIG. 6, there is shown a potential subscriber 80 having wireless personal messaging device 18 and internet accessible personal computer 82 with conventional data storage means (not shown) generally including a hard drive and CD-drive.

To initiate the registration process to become a subscribing user, at step 170 potential subscriber 80 accesses on computer 82 a website 28 maintained and controlled by web server 26 operated by the operator of the system of the invention, and accesses a registration page provided on said website. On said registration page a query box prompts the user to enter information including, in addition to ordinary identification of name and address, and to the credit card information required for the processing of credit card payments, also the telephone number of the user's wireless messaging device 18.

To confirm the association between user 80 and the wireless messaging device telephone number reported by said user, the following confirmation procedure is preferably used, and should take place in the course of the initial registration procedure.

At step 172 on FIG. 6 web server 26 forwards the user information provided as described above to order server 30. At step 174 said order server generates a random, one-time-use challenge string 84, and then it transmits said challenge string, preferably via internet communication means, to Short Message Service center 24, and also to web server 26. At step 176 SMS center 24 then calls the telephone number reported by the user and messages said challenge string to the called number; concurrently, web server 26 displays a "challenge string confirmation input page" (not shown) to potential subscriber 80. At step 178 the potential subscriber then extracts challenge string 84 from his or her wireless messaging device, and, on his or her computer 82, enters said challenge string onto a dialog box on said confirmation input page, presented to said potential subscriber by the registration process of website 28. At step 180, web server 26 then passes the challenge string as input by said potential subscriber to order server 30, for a verification whether it matches the challenge string initially generated by order server 30 as described above. Upon such verification, at step 182 order server 30 registers said potential subscriber as a registered member, entitled to automatic fulfillment of recording orders. At step 184, web server 26 displays a membership confirmation page (not shown) to new member 80.

Pay-Per-View Embodiments

Embodiments of the present invention may also comprise means for access to recordings of performance segments over cable and satellites pay-for-view networks. Such access might thus be provided as an adjunct to the performance venue ordering procedures described above, in circumstances where sufficient demand warrants pay-per-view hook-ups, preferably also using means to encode all performance segments in a manner that precludes the recording of any performance segment by a television viewer without payment of a set recording fee as advertised to viewers.

Figure 9:
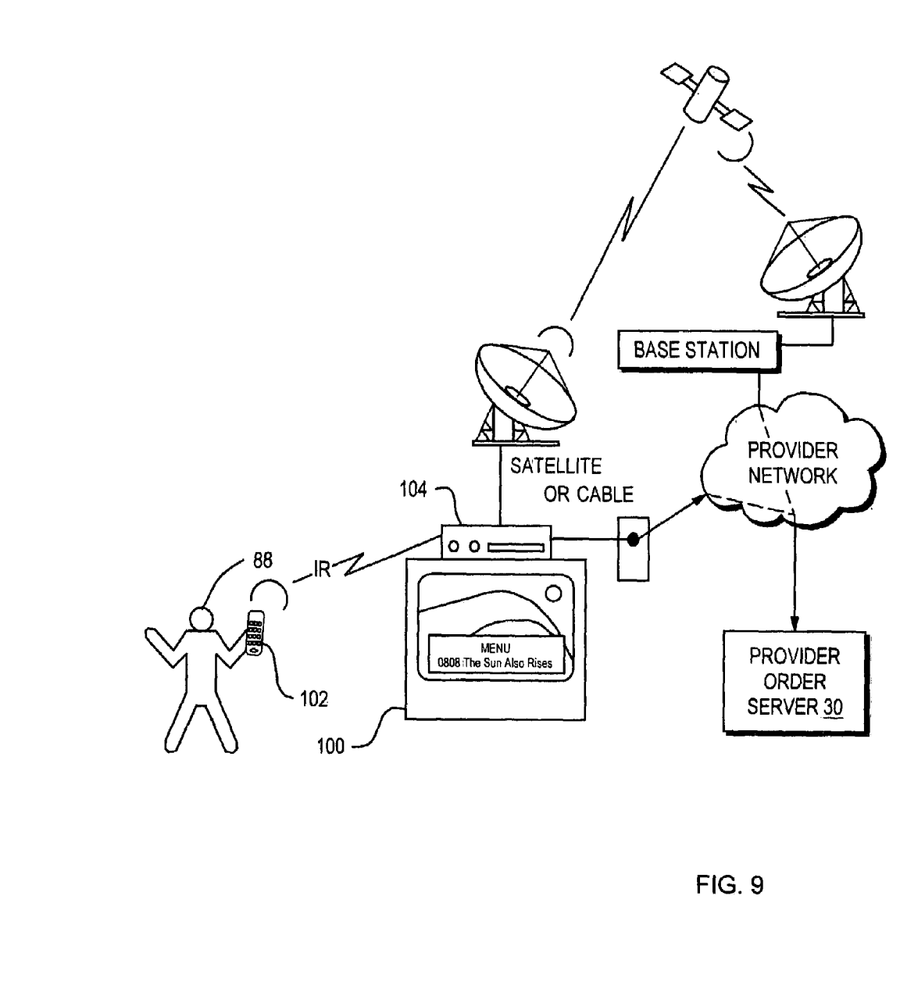
FIG. 9 illustrates a process according to the invention for enabling television viewers to order recordings of performance segments shown in pay-per-view broadcasts.

FIG. 9 thus illustrates the principal components needed to support such pay-per-view access, and shows a home viewer employing the set-top converter box 72 of a conventional home entertainment system 84 to order one or more recordings of performance segments from a content provider order server 86. Said content provider order server accesses performance segments stored on a recording files database 32 (which may be the same storage device employed by order server 30 to store segment recordings for access by other means as described earlier).

Upon receipt of a download requests from a cable or satellite access customer, content provider order server 86 downloads the requested segment or segments to a data storage component ancillary to the said customer's set-top converter box, and, on completion of such download, said content provider order server 86 simply debits that customer's account for the purchase price of such download. The downloaded performance segments may then be viewed by said customer at the customer's convenience.

Thus, in step 210 shown on FIG. 9 a home viewer 88 watches a live performance fed to the viewer's home entertainment system via cable or satellite feed to a set-top converter box 104 that is programmable typically via a hand-held remote (not shown). Preferably the broadcast of said live performance is accompanied by access, step 212, to a "recording purchase menu" 100 listing performance segments available for download, possibly including previously recorded performance segments in addition to those then being broadcast live.

Figure 10:
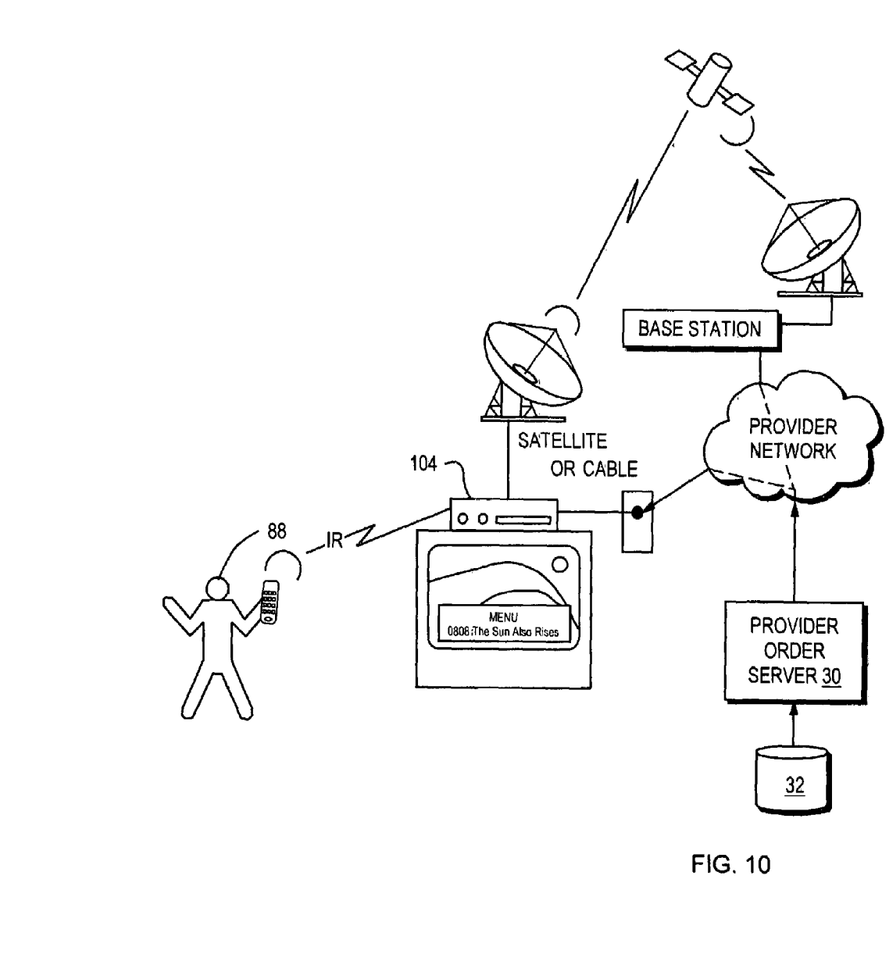
FIG. 10 illustrates a payment process and a recording download process applicable to the pay-per-view embodiment of the invention illustrated in FIG. 9.

At step 214 viewer 88 issues a "purchase recording" command identifying a selection of performance segments to be downloaded, and, at step 216 the viewer's set-top converter box 104 in turn transmits a corresponding purchase request to the viewer's cable or satellite content provider. In response to this purchase request, in FIG. 10, a content provider order server 86 manages the fulfillment of said purchase request, proceeding at steps 220-222 to effect a download of the requested recordings to the viewer's set-top box, for storage on local storage means, and said content provider order server 30 at step 224 then charges the home cable or satellite account of viewer 88 for the purchase price of said recording (and, where applicable, credits right holders in the downloaded recordings for any royalties earned from said download).

As with other types of downloads described in this specification., it is appropriate in pay-per-view downloads to provide security means to minimize unauthorized copying and distribution of downloaded recordings, for example by applying watermarks to the recording files to be downloaded and associating such watermarks with the particular viewer account purchasing a download.

Security Considerations

Various aspects of the present invention, principally including its reliance upon wireless messaging devices as a primary means for ordering recordings, require the implementation and use of strong security procedures, such as are well-known to persons of skill in the design of internet commerce applications. While security considerations are not described or discussed in any detail in this description, it will be apparent to persons of skill in the art of internet commerce that very careful attention must be given to security considerations in the design and implementation of any system according to the present invention.

The invention claimed is:

1. A system for the distribution of a recording of a live performance to audience members, said system comprising:
   (a) means at a live performance venue for recording a performance;
   (b) means for uploading a digital recording of at least a segment of a said performance into a database linked to an internet web server;
   (c) means for generating, with respect to each said digital recording, a plurality of internet URL addresses from each of which URL addresses a single download of a copy of said digital recording may be effected;
   (d) means for receiving and processing a plurality of orders for a said digital recording that have each been placed by an audience member at said venue via a textual message from a personal wireless messaging device;
   (e) means for uniquely associating each of said plurality of internet URL addresses with a different one of said plurality of orders placed for a said digital recording;
   (f) means for fulfilling said plurality of orders comprising means for transmitting, to each wireless messaging device from which a said order has been placed, a textual message comprising an identification of the internet URL address thus uniquely associated with the order placed from said wireless messaging device.

2. The system of claim 1 wherein said means for fulfilling said orders further comprises means for conditioning fulfillment of any specific one of said orders to the making of a payment.

3. The system of claim 2 further comprising means for managing an automated pre-payment program.

4. The system of claim 3 further comprising automated means for managing the making of a payment by recourse to a third-party provider of payment services.

5. The system of claim 4 wherein said third-party provider of payment services is a "900 area code" billing service.

6. The system of claim 1 wherein said recording of a performance is a distinct segment of a concert performance.

7. The system of claim 6 further comprising means for associating each said segment with a unique identifier that is displayed to said audience members at said venue.

8. The system of claim 7 wherein orders for recordings of a selected performance segment are placed by textually messaging the segment identifier associated with said selected segment via a personal wireless messaging device to a telephone number displayed to said audience members at said venue.

9. The system of claim 8 wherein said displayed telephone number accesses means to receive and parse textual messages sent from a personal wireless communications device.

10. A method for marketing and delivering digitized files comprising recordings of live performance segments, said method employing computer means linked to the internet, recording means located at a live performance venue and linked to said computer means, and user-controlled, personal, two-way, addressable, messaging-capable electronic communications devices such as cellular telephones, said method comprising the steps of:

(a) making a recording at said venue of each of a plurality of performance segments;

(b) storing each said recording in a digital format in a database managed by said computer means;

(c) providing audience members at said live performance venue with performance segment identifiers, and at least one receiving device access number at which a recording order may be placed for a said recording of a performance segment, via a textual message containing a said performance segment identifier transmitted from a personal communications device to a said at least one receiving device;

(d) operating a messaging service linked to said computer means and adapted to receive a said recording order transmitted via a textual message from a personal communications device, and to forward each said recording order to said computer means;

(e) causing said computer means, on receipt of a said recording order, to log said recording order in association with the address of the personal communications device that generated said recording order;

(f) causing said computer means to generate, for each recording order, a unique internet URL address from which a single download of a digital file of the performance segment identified in said recording order may be effected, and (g) textually messaging said URL address identifier via said messaging service to the personal communications device from which said recording order was placed.

11. The method of claim 10 comprising the further step of operating an automated payment management service adapted to enable each person placing a recording order to arrange for payment of said recording order.

12. The method of claim 10 comprising the further step of conditioning sold messaging of a URL address identifier to the making of a payment arrangement.

* * * * *